No. 890,589. PATENTED JUNE 9, 1908.
E. W. POTTS.
TRANSMISSION GEAR.
APPLICATION FILED JAN. 2, 1906.
2 SHEETS—SHEET 2
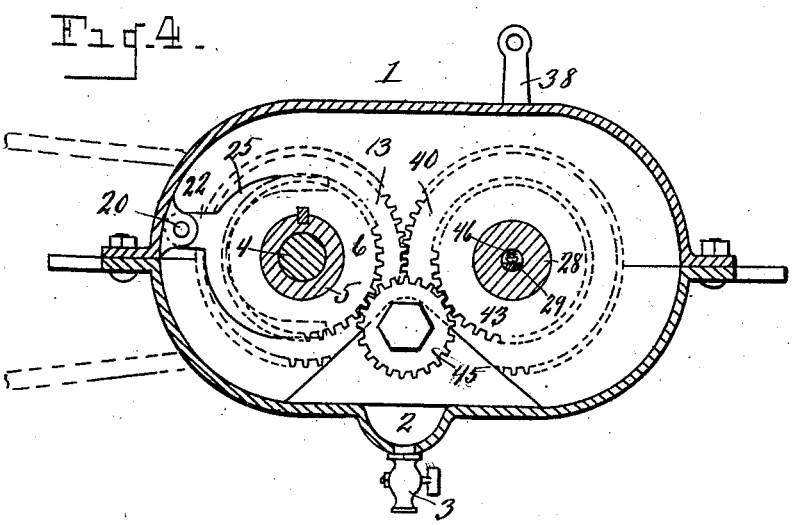
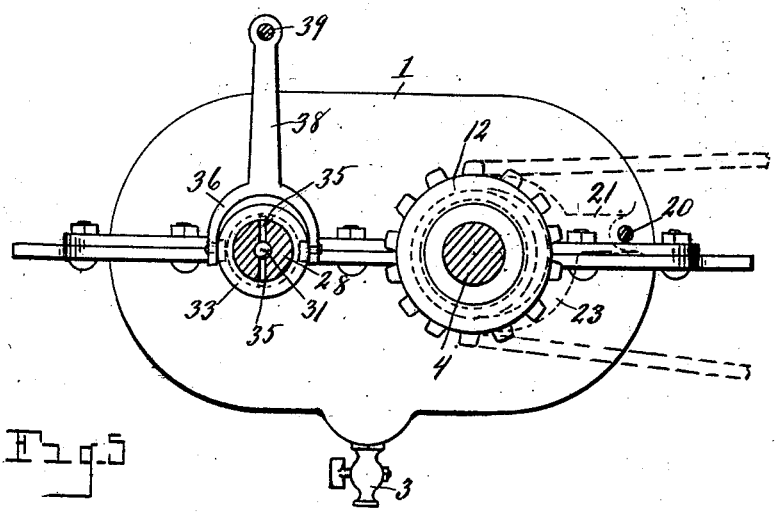
Witnesses.
Inventor.
Elijah W. Potts.

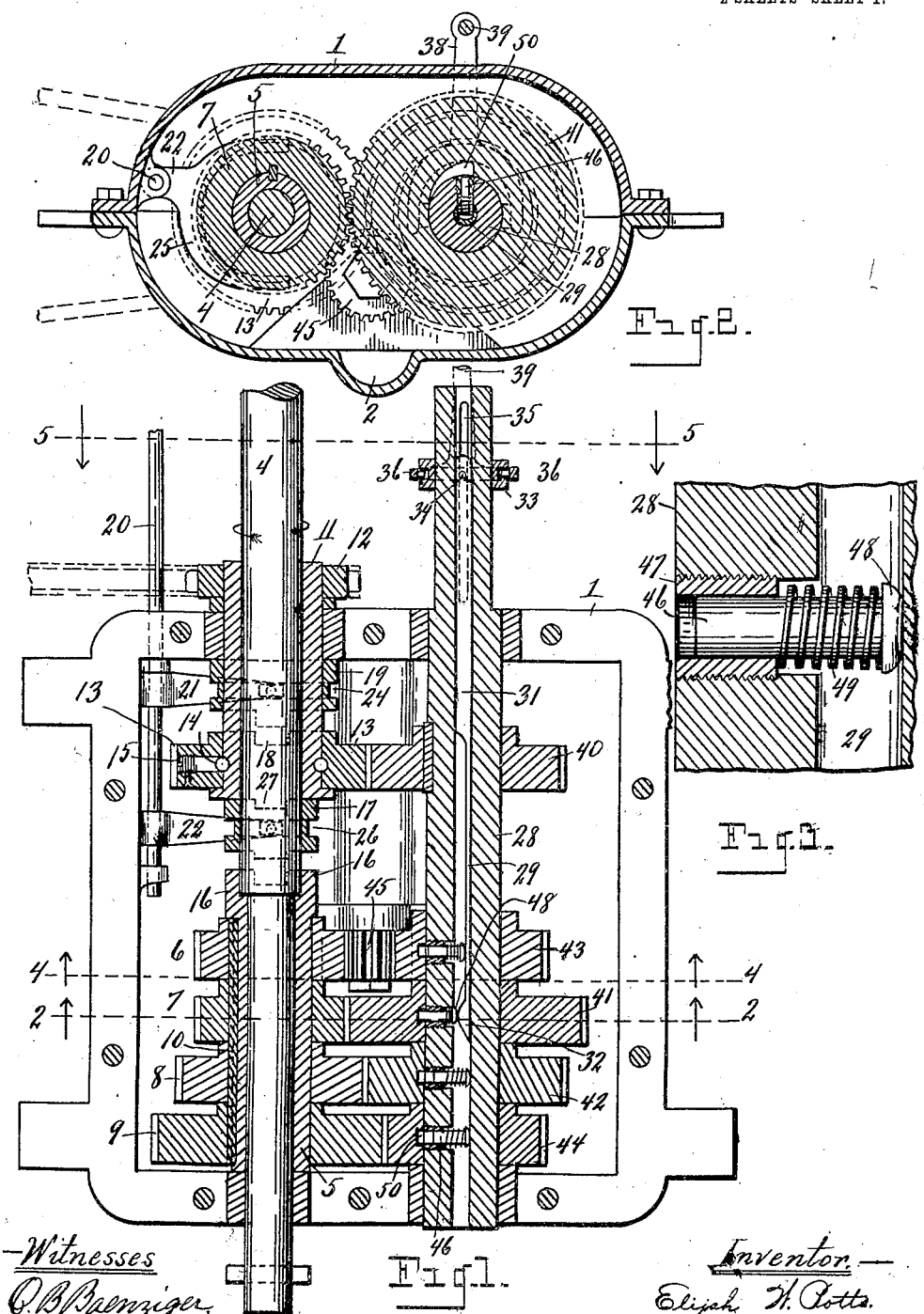

UNITED STATES PATENT OFFICE.

ELIJAH W. POTTS, OF DETROIT, MICHIGAN, ASSIGNOR, BY DIRECT AND MESNE ASSIGNMENTS, OF TWO-SIXTEENTHS TO ALBERT W. WADSWORTH, ONE-SIXTEENTH TO SAMUEL P. BRADLEY, ONE-SIXTEENTH TO LOUIS COHN, AND ONE-SIXTEENTH TO THEODORE L. WIGGINS, ALL OF DETROIT, MICHIGAN.

TRANSMISSION-GEAR.

No. 890,589.　　　Specification of Letters Patent.　　　Patented June 9, 1908.

Application filed January 2, 1906. Serial No. 294,124.

*To all whom it may concern:*

Be it known that I, ELIJAH W. POTTS, a citizen of the United States, residing at Detroit, in the county of Wayne, State of Michigan, have invented certain new and useful Improvements in Transmission-Gears; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in transmission gearing, especially designed for the driving of automobiles, and consists in the construction and arrangement of parts hereinafter fully set forth and pointed out particularly in the claims.

The object of the invention is to provide a transmission mechanism of simple and inexpensive construction, wherein the arrangement is such as to afford variable speeds; to permit of a change from one speed to another; to permit the direction of rotation of the driven shaft to be readily reversed, and to allow of the car being driven directly without turning any of the gear wheels in the transmission mechanism.

The above object is attained by the structure illustrated in the accompanying drawings, in which:—

Figure 1 is a horizontal section through the gear case and the transmission mechanism therein, the driving shaft appearing in elevation. Fig. 2 is a transverse section as on line 2—2 of Fig. 1. Fig. 3 is an enlarged fragmentary view of a portion of the counter shaft, showing the spring-retracted locking-pin therein, through the medium of which the gear wheels are locked to said shaft, said pins being adapted to be operated by an actuating key. Fig. 4 is a transverse section as on line 4—4 of Fig. 1. Fig. 5 is a similar section as on line 5—5 of Fig. 1.

Referring to the characters of reference, 1 designates a gear case in which the transmission mechanism is confined, said case being closed to retain therein the oil in which the gearing runs, and having in the bottom thereof a depression 2 to receive the sediment which may be withdrawn through the plug cock 3.

Passing through the case and suitably journaled therein is the driving shaft 4 connected in the usual manner with the engine or motor, not shown. The reduced end of the shaft 4 is embraced by a sleeve 5 within which said shaft is adapted to rotate. Mounted upon said sleeve are the pinions 6 and 7 and the gear wheels 8 and 9, said gears and pinions being secured to said sleeve by the key 10, whereby all of said gears and pinions are caused to turn with said sleeve. The opposite end or enlarged portion of the driving shaft 4 is also embraced by a loose sleeve 11 within which said shaft may rotate and upon the outer end of which, that projects through the case, is a sprocket wheel 12 fixed thereto to rotate therewith, said sprocket wheel being connected by a suitable driving chain with the axle of the vehicle.

Loosely mounted upon the sleeve 11 within the case, is the gear wheel 13 which is held against lateral movement and afforded a suitable bearing on said sleeve by means of a ring of balls 14 which lie in a peripheral channel of the sleeve, and in a corresponding channel in the inner wall of the hub of said gear, said balls being inserted through a diametrical opening in the gear wheel, closed by the screw plug 15 whose inner end screws into contact with said balls.

The inner end of sleeve 5 is provided with clutch members 16. Splined on the shaft 4 adjacent to the end of said sleeve is a clutch collar 17 having a clutch member adapted to engage the clutch member at the end of the sleeve 5, whereby said sleeve may be locked to the shaft 4. The hub of gear wheel 13 is provided with a jaw clutch member 18. Splined upon sleeve 11 adjacent to the hub of gear wheel 13 is a clutch collar 19 adapted to engage the clutch member on the hub of gear wheel 13, whereby said gear wheel may be locked to said sleeve 11.

The clutch collars 17 and 19 are actuated through the medium of a reciprocatory rod 20 which passes through the end of the case and carries upon the inner end thereof the laterally projecting arms 21 and 22. Arm 21 is connected to clutch collar 19 by a fork 23 mounted thereon (see dotted lines in Fig. 5) which embraces the collar 19 and is provided with pins which lie in the peripheral channel 24 of said collar to effect a shifting of said clutch collar in a manner well understood in the art. In like manner arm 22 is provided with a fork 25 which embraces the collar 17 and is provided with pins which engage in the peripheral channel 16 of said collar. By this arrangement the longitudinal movement of the rod 20 will shift the clutch collars 17 and 19 in unison. Clutch collar 17 is also provided with clutch members adapted to engage corresponding members 27 on the end of sleeve 11, whereby said sleeve may be locked to the shaft 4.

Journaled in the case parallel with the shaft 4 is a counter shaft 28 having a central aperture 29 extending longitudinally thereof in which is adapted to reciprocate a bar 31 having upon the reduced inner end thereof a beveled key 32. Embracing the projecting end of shaft 28 is a collar 33 which is connected by a transverse pin 34 with the end of bar 31, said pin lying in opposed slots 35 in the opposite walls of said shaft. Embracing the collar 33 is a yoke 36 having pins which engage in the peripheral channel 37 of said collar, said yoke being connected to an arm 38 adapted to be actuated by a reciprocatory rod 39 to slide the clutch 33 and reciprocate the bar 31 within the shaft 28.

Keyed to shaft 28 within the case is a gear wheel 40 which meshes with the gear wheel 13 mounted on the sleeve 11. Loosely mounted upon the shaft 28 within the case, are the gear wheels 41 and 42 and the pinions 43 and 44. Meshing with pinion 43 is an idle pinion 45 which in turn meshes with pinion 6 on sleeve 5. The gear wheels 41 and 42 on shaft 28 mesh with pinion 7 and gear wheel 28 respectively on said sleeve 5, while pinion 44 on shaft 28 meshes with gear wheel 9 on said sleeve.

Seated within the hollow shaft 28 and embraced by the hubs of the gear wheels 41 and 42 and the hubs of the pinions 43 and 44, are the locking pins 46 which extend from the central opening through the wall of said shaft and which are confined in place by the screw plugs 47 through which said pins reciprocate. Each of the pins is provided with a rounded head 48 and embracing each pin between said head and the plug 47, is a coiled spring 49 which normally retracts said pin and holds its outer end within the plane of the periphery of the shaft 28. By a movement of the bar 31 longitudinally of the shaft 28, the key 32 on the end of said arm may be caused to separately engage the rounded heads 48 of the pins 46 and force said pins outwardly, one at a time, so as to cause the outer end of each locking pin to enter a recess 50 in the hub of the gear wheel with which said locking pin is associated, thereby locking the gear wheel to shaft 28 and causing said shaft to turn therewith.

It will be noted that as soon as the rounded head is moved past one of the pins in either direction, said pin is immediately retracted by its spring 49, thereby permitting but one of the gears or pinions at a time to be locked to shaft 28, and making it possible to lock to the shaft at any time, any one of said gears or pinions desired.

In the operation of this transmission mechanism, when it is desirable to propel the car directly, the clutch collars 17 and 19 are moved to the position shown in Fig. 1, wherein clutch collar 19 is disconnected from the hub of gear 13 and clutch collar 17 is connected with the end of sleeve 11 thereby causing said sleeve to turn with shaft 4 and the sprocket wheel 12 on said sleeve to turn in unison with said shaft, at which time all of the gear wheels of the transmission mechanism remain idle, owing to the fact that sleeve 5 is disconnected from shaft 4 and that gear wheel 13 is loose upon sleeve 11. When it is desired to drive the car indirectly, the clutch collars 17 and 19 are actuated so as to lock sleeve 5 to shaft 4 and gear wheel 13 to sleeve 11, at which time all of the gears and pinions upon sleeve 5 will revolve, but shaft 28 will remain idle, owing to the fact that the gears and pinions thereon meshing with those on the sleeve 5, are loose upon said shaft. To drive the shaft 28 through any of the gears or pinions mounted thereon, the bar 31 is moved so as to cause the key 32 on the end thereof to engage and extend the pin of the gear wheel or pinion it is desired to place in service, as shown in Fig. 1, wherein said key is shown as extending the locking pin 46 of the gear wheel 41, thereby locking said gear wheel to shaft 28, and causing a rotation of said shaft through the pinion 7 on sleeve 5. The rotation of shaft 28 causes the rotation of gear wheel 40, which meshing with gear wheel 13 on sleeve 11, causes a rotation of said sleeve when the gear wheel 13 is locked thereto by the clutch collar 19, thereby rotating the driving sprocket wheel 12. By moving the bar 31 longitudinally of the shaft 28, gear wheel 41 or pinion 44 may be brought into service by projecting the locking pins thereof in like manner, thereby varying the speed of the car as desired. To drive the car backward, the key 32 is caused to engage and project the pin 46 of the pinion 43, which being driven through the pinion 6 and idle pinion 45, will cause shaft 28 to turn in the opposite direction, thereby reversing the direction of rotation of the sleeve 11, as will be well understood.

It will now be evident that by bringing the clutch collar 17 into engagement with the end of sleeve 11, the car may be driven directly, and that when so driven, all of the gear wheels in the transmission mechanism are idle, obviating all wear upon said parts and all noise incident to their operation. It will also be evident that by disconnecting sleeve 11 from the driving shaft, and connecting sleeve 5 therewith, any one of the several sets of gears may be placed in operation to drive the car forward at variable speeds, or backward, as desired.

Having thus fully set forth my invention, what I claim as new and desire to secure by Letters Patent, is:—

1. In a transmission mechanism, the combination with the driving shaft, of a driving gear wheel supported by but rotatable independently of said shaft, gearing for driving said gear wheel indirectly at variable speeds, comprising gear wheels rotatable in unison loosely mounted on the driving shaft, means for locking said gear wheels to the driving shaft, and means for connecting the driving gear wheel directly to the driving shaft to afford a direct drive and for disconnecting all of the gears of the mechanism from the driving shaft.

2. In a transmission mechanism, the combination of the driving shaft, a sleeve on the driving shaft a driving gear carried on said sleeve, a counter shaft, a train of gears connecting the driving and counter shafts, means for connecting the counter shaft with the sleeve on the driving shaft, and means for locking said sleeve directly to the driving shaft.

3. In a transmission mechanism, the combination of the motor shaft, a loose sleeve thereon, a driving gear on said sleeve, means for locking the sleeve to the driving shaft to effect a direct drive, a second sleeve loose on the driving shaft gear wheels fixed thereon, a counter shaft, gear wheels loose on the counter shaft meshing with the gear wheels on said sleeve, means for locking the gear wheels on the counter shaft independently thereto, means connecting the driving and counter shafts to reverse the rotation of the latter, a gear fixed on the counter shaft, a gear normally loose on the sleeve carrying the driving gear, means for locking the loose gear on said sleeve thereto.

4. In a transmission mechanism, the combination of the motor shaft, a sleeve rotatable on said shaft, gear wheels upon said sleeve, a counter-shaft gear wheels loose thereon meshing with the gear wheels on the sleeve of the motor shaft, means for locking the gear wheels on the counter-shaft independently thereto, a second sleeve on the motor shaft a driving wheel carried thereby, means connecting the counter-shaft with said last-mentioned sleeve for rotating it indirectly through the sets of gears, and means for connecting the sleeve carrying the driving wheel directly to the motor shaft.

5. In a transmission mechanism, the combination of the motor shaft, a driving wheel mounted thereon and independently rotatable, gearing mounted upon said shaft, means for connecting said gearing indirectly to said wheel to afford an indirect drive, means for connecting said wheel to the motor shaft and disconnecting and rendering idle the indirect driving gears.

6. In a transmission mechanism, the combination of the motor shaft, a counter-shaft, a sleeve loose upon the motor shaft gear wheels fixed thereto, gear wheels loose upon the counter shaft meshing with the gear wheels on said sleeve, a second sleeve loose upon the motor shaft a driving wheel fixed thereto, gears connecting said last-mentioned sleeve with the counter-shaft, means for locking the loose gears on the counter-shaft independently thereto, means for locking the first-mentioned sleeve to the motor shaft to afford an indirect drive, and means for locking the last-mentioned sleeve to the motor shaft to cause the driving wheel to turn therewith.

In testimony whereof, I sign this specification in the presence of two witnesses.

ELIJAH W. POTTS.

Witnesses:
  E. S. WHEELER,
  I. G. HOWLETT.